United States Patent
Baek et al.

(10) Patent No.: US 11,121,357 B2
(45) Date of Patent: Sep. 14, 2021

(54) POSITIVE ELECTRODE ACTIVE MATERIAL FOR SECONDARY BATTERY AND METHOD OF PREPARING THE SAME

(71) Applicant: LG Chem, Ltd., Seoul (KR)

(72) Inventors: So Ra Baek, Daejeon (KR); Ji Hye Kim, Daejeon (KR); Tae Gu Yoo, Daejeon (KR); Wang Mo Jung, Daejeon (KR); Byung Chun Park, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/320,859

(22) PCT Filed: Feb. 2, 2018

(86) PCT No.: PCT/KR2018/001470
§ 371 (c)(1),
(2) Date: Jan. 25, 2019

(87) PCT Pub. No.: WO2018/143734
PCT Pub. Date: Aug. 9, 2018

(65) Prior Publication Data
US 2019/0165362 A1    May 30, 2019

(30) Foreign Application Priority Data

Feb. 2, 2017   (KR) .................. 10-2017-0015158
Feb. 2, 2018   (KR) .................. 10-2018-0013454

(51) Int. Cl.
*H01M 4/131*      (2010.01)
*H01M 4/505*      (2010.01)
(Continued)

(52) U.S. Cl.
CPC ............. *H01M 4/131* (2013.01); *C01B 35/10* (2013.01); *H01M 4/139* (2013.01);
(Continued)

(58) Field of Classification Search
CPC ...... H01M 4/131; H01M 4/139; H01M 4/483; H01M 4/485; H01M 10/0525;
(Continued)

(56) References Cited

U.S. PATENT DOCUMENTS

2002/0071990 A1   6/2002   Kweon et al.
2002/0071991 A1   6/2002   Kweon et al.
(Continued)

FOREIGN PATENT DOCUMENTS

CN   1457519 A   11/2003
CN   1507090 A   6/2004
(Continued)

OTHER PUBLICATIONS

Extended European Search Report including Written Opinion for Application No. EP18747131.3 dated Oct. 4, 2019.
(Continued)

*Primary Examiner* — Andrew J. Oyer
(74) *Attorney, Agent, or Firm* — Lerner, David, Littenberg, Krumholz & Mentlik, LLP

(57) ABSTRACT

The present invention relates to a positive electrode active material for a secondary battery, which includes a core including a lithium composite metal oxide, and a surface treatment layer which is disposed on the core and includes an amorphous oxide containing a lithium (Li) oxide, a boron (B) oxide, and an aluminum (Al) oxide, wherein an amount of a lithium by-product present on a surface of the positive electrode active material is less than 0.55 wt % based on a total weight of the positive electrode active material, and a method of preparing the same.

14 Claims, 3 Drawing Sheets

(51) Int. Cl.
  *H01M 4/525* (2010.01)
  *H01M 10/052* (2010.01)
  *H01M 4/139* (2010.01)
  *H01M 4/48* (2010.01)
  *H01M 4/485* (2010.01)
  *C01B 35/10* (2006.01)
  *H01M 4/36* (2006.01)
  *H01M 10/0525* (2010.01)
  *H01M 4/1391* (2010.01)
  *H01M 4/62* (2006.01)
  *H01M 4/02* (2006.01)

(52) U.S. Cl.
  CPC ......... *H01M 4/1391* (2013.01); *H01M 4/366* (2013.01); *H01M 4/483* (2013.01); *H01M 4/485* (2013.01); *H01M 4/505* (2013.01); *H01M 4/525* (2013.01); *H01M 4/623* (2013.01); *H01M 4/625* (2013.01); *H01M 10/052* (2013.01); *H01M 10/0525* (2013.01); *H01M 2004/021* (2013.01); *H01M 2004/028* (2013.01); *Y02E 60/10* (2013.01); *Y02T 10/70* (2013.01)

(58) Field of Classification Search
  CPC .... H01M 4/1391; H01M 4/623; H01M 4/625; H01M 4/505; H01M 4/525; H01M 10/052; H01M 2004/021; H01M 2004/028; H01M 4/366; C01B 35/10; Y02E 60/122; Y02T 10/7011
  See application file for complete search history.

(56) References Cited

U.S. PATENT DOCUMENTS

| | | |
|---|---|---|
| 2002/0110736 A1 | 8/2002 | Kweon et al. |
| 2003/0148182 A1 | 8/2003 | Park et al. |
| 2004/0110065 A1* | 6/2004 | Hamano ............... C01G 53/40 429/231.3 |
| 2004/0200998 A1 | 10/2004 | Park et al. |
| 2008/0166637 A1 | 7/2008 | Inagaki et al. |
| 2012/0064411 A1 | 3/2012 | Lee et al. |
| 2015/0108397 A1 | 4/2015 | Takeoka et al. |
| 2015/0162599 A1 | 6/2015 | Takei et al. |
| 2016/0013476 A1 | 1/2016 | Oh et al. |
| 2017/0222221 A1 | 8/2017 | Park et al. |
| 2017/0309898 A1 | 10/2017 | Hong |

FOREIGN PATENT DOCUMENTS

| | | |
|---|---|---|
| CN | 1797822 A | 7/2006 |
| CN | 102832389 A | 12/2012 |
| CN | 104781960 A | 7/2015 |
| JP | 2002164053 A | 6/2002 |
| JP | 2009152214 A | 7/2009 |
| JP | 2009218217 A | 9/2009 |
| JP | 2015099767 A | 5/2015 |
| JP | 2015130273 A | 7/2015 |
| JP | 2015213038 A | 11/2015 |
| JP | 2017050204 A | 3/2017 |
| KR | 20030083476 A | 10/2003 |
| KR | 20040049811 A | 6/2004 |
| KR | 20120027707 A | 3/2012 |
| KR | 20130108717 A | 10/2013 |
| KR | 20140025102 A | 3/2014 |
| KR | 20160045029 A | 4/2016 |
| KR | 20160049995 A | 5/2016 |
| WO | 2016099229 A1 | 6/2016 |

OTHER PUBLICATIONS

Search report from International Application No. PCT/KR2018/001470, dated May 14, 2018.
Singh, D., et al., "Optical and structural properties of Li2O—Al2O3—B2O3 glasses before and after y-irradiation effects." Journal of Applied Physics, vol. 104, 103515, accepted Sep. 2, 2008; published online Nov. 19, 2008, pp. 1-5.
Cao, H. et al., "LiAlO2-coated LiCoO2 as cathode material for lithium ion batteries", Solid State Ionics, Jan. 2005, pp. 911-914, vol. 176, Elsevier, China.
Chinese Search Report for Application No. 201880003376.4 dated Mar. 26, 2021, pp. 1-3.

* cited by examiner

POSITIVE ELECTRODE ACTIVE MATERIAL FOR SECONDARY BATTERY AND METHOD OF PREPARING THE SAME

CROSS-REFERENCE TO RELATED APPLICATIONS

The present application is a national phase entry under 35 U.S.C. § 371 of International Application No. PCT/KR2018/001470 filed Feb. 2, 2018, which claims priority from Korean Patent Application No. 2017-0015158, filed on Feb. 2, 2017, and Korean Patent Application No. 2018-0013454, filed on Feb. 2, 2018, the disclosures of which are incorporated herein by reference.

TECHNICAL FIELD

The present invention relates to a positive electrode active material for a secondary battery, in which resistance is reduced and gas generation in the secondary battery is reduced, and a method of preparing the same.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

However, lithium secondary batteries have limitations in that lifetime rapidly decreases as charge and discharge are repeated. In particular, these limitations are more serious in a long-life or high-voltage battery. The reason for this is due to a phenomenon that occurs when an electrolyte is decomposed or an active material is degraded due to moisture in the battery or other effects, and the internal resistance of the battery increases. Particularly, with respect to a positive electrode material, if degradation of the positive electrode material itself is intensified, dissolution of positive electrode active material components is increased and, as a result, the battery lifetime is rapidly degraded or it is not possible to use the battery at a high voltage.

In order to address these limitations, methods of forming a surface treatment layer on a surface of the positive electrode active material have been proposed. Among these methods, with respect to an aluminum-based surface treatment layer in which stabilities at a high voltage and in an electrolyte solution are recognized, since the aluminum-based surface treatment layer in a crystalline state is coated on the surface of a particle, it is difficult for the entire active material to be uniformly coated with the aluminum-based surface treatment layer. Also, there is a limitation in that resistance may be increased due to crystallinity of the aluminum-based compound itself. Furthermore, with respect to a boron (B)-based coating, since the boron (B)-based coating is uniformly formed in an amorphous state, it does not interfere with the movement of lithium ions from the positive electrode material to the electrolyte solution. However, since the boron (B)-based coating reacts with moisture, there is a limitation in that it does not serve as a coating layer when the reaction with the electrolyte solution is prolonged.

Thus, development of a positive electrode active material, which may improve lithium secondary battery performance while addressing the above limitations, is urgently required.

DISCLOSURE OF THE INVENTION

Technical Problem

An aspect of the present invention provides a positive electrode active material, in which output characteristics are excellent due to a decrease in resistance and gas generation in a secondary battery is reduced, and a method of preparing the same.

Technical Solution

According to an aspect of the present invention, there is provided a positive electrode active material for a secondary battery including: a core including a lithium composite metal oxide; and a surface treatment layer which is disposed on the core and includes an amorphous oxide containing a lithium (Li) oxide, a boron (B) oxide, and aluminum (Al) oxide, wherein the lithium oxide, the boron oxide, and the aluminum oxide are chemically bonded to one another, and, in the amorphous oxide in the surface treatment layer, an amount of the aluminum oxide is greater than an amount of the boron oxide, and an amount of a lithium by-product present on a surface of the positive electrode active material is less than 0.55 wt % based on a total weight of the positive electrode active material.

According to another aspect of the present invention, there is provided a method of preparing a positive electrode active material for a secondary battery including: preparing a mixture by mixing a lithium composite metal oxide, a boron-containing raw material, and an aluminum-containing raw material; and forming a surface treatment layer including an amorphous oxide on a core including the lithium composite metal oxide by performing a heat treatment on the mixture in an oxygen atmosphere, wherein the forming of the amorphous oxide is to form an amorphous oxide containing lithium, boron, and aluminum by reaction of a lithium by-product present on a surface of the lithium composite metal oxide with the boron-containing raw material and the aluminum-containing raw material, an amount of the aluminum-containing raw material included is greater than 1 time to less than 2.5 times an amount of the boron-containing raw material included, and the heat treatment is performed in a temperature range of 500° C. to 800° C.

According to another aspect of the present invention, there is provided a positive electrode for a secondary battery and a secondary battery which include the above positive electrode active material, a binder, a conductive agent, and a positive electrode collector.

According to another aspect of the present invention, there is provided a secondary battery which include the above positive electrode, a negative electrode disposed to face the positive electrode, a separator disposed between the positive electrode and the negative electrode, and an electrolyte.

Advantageous Effects

Since a positive electrode active material of the present invention has excellent lithium ion conductivity even if a surface treatment layer including an amorphous oxide is disposed on a core including a lithium composite metal oxide, a resistance increase rate is low even if the number of charge and discharge cycles is increased, and thus, output characteristics may be excellent.

The positive electrode active material of the present invention may prevent damage of the lithium composite metal oxide due to an electrolyte solution and hydrogen fluoride derived from the electrolyte solution by allowing the surface treatment layer including the amorphous oxide on the core including the lithium composite metal oxide to prevent a direct contact between the core and the electrolyte solution. Also, gas generation derived from the contact may be prevented.

In the positive electrode active material of the present invention, since LiOH and $Li_2CO_3$, which are present on the surface of the positive electrode active material during the formation of the surface treatment layer, are removed by reaction with boron- and/or aluminum-containing materials, the amount of a lithium by-product in the positive electrode active material may be reduced.

MODE FOR CARRYING OUT THE INVENTION

Figure 1:
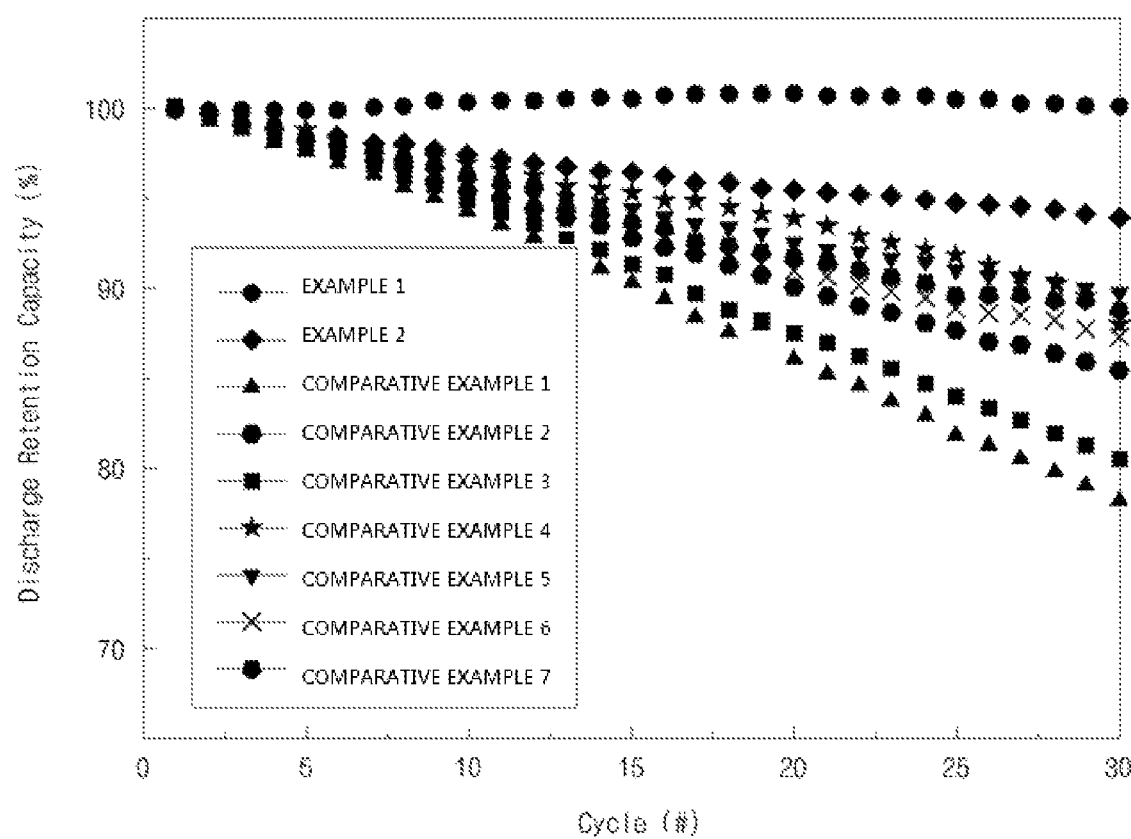
FIG. 1 is a graph illustrating discharge capacity retentions relative to an initial cycle of lithium secondary batteries prepared in Examples 1 and 2, and Comparative Examples 1 to 7.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material for a secondary battery according to an embodiment of the present invention may include a core including a lithium composite metal oxide.

The lithium composite metal oxide is a compound capable of reversibly intercalating and deintercalating lithium (lithiated intercalation compound). For example, the lithium composite metal oxide may be a layered lithium composite metal oxide which may be used at high capacity and high voltage.

The lithium composite metal oxide may be represented by Formula 1 below.

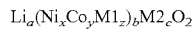  <Formula 1>

In Formula 1, M1 is at least one element selected from the group consisting of manganese (Mn) and aluminum (Al), and M2 is at least one element selected from the group consisting of barium (Ba), calcium (Ca), zirconium (Zr), titanium (Ti), magnesium (Mg), tantalum (Ta), niobium (Nb), and molybdenum (Mo), wherein $1 \le a \le 1.5$, $0.9 \le b \le 1$, $0 \le c \le 0.1$, $0.6 \le x < 1$, $0 < y < 0.4$, $0 < z \le 0.4$, and $b+c=1$.

In the lithium composite metal oxide represented by Formula 1, lithium (Li) may be included in an amount corresponding to a, that is, $1 \le a \le 1.5$, for example, $1 \le a \le 1.2$. When a satisfies the above-described range, an effect of improving capacity characteristics of the positive electrode active material according to the control of the amount of the Li is significant, and sinterability during the preparation of the active material may be balanced. When a is less than 1, capacity may be reduced, and, when a is greater than 1.5, since particles are sintered in a sintering process, the preparation of the active material may be difficult.

In the lithium composite metal oxide represented by Formula 1, nickel (Ni) may be included in an amount corresponding to x, that is, $0.6 \le x < 1$, for example, $0.7 \le x < 0.95$. When the amount of the Ni satisfies the above range, a high-capacity positive electrode active material may be obtained.

In the lithium composite metal oxide of Formula 1, cobalt (Co) may be included in an amount corresponding to y, that is, $0 < y < 0.4$, particularly $0 < y \le 0.2$, and more particularly $0.04 < y \le 0.15$. When the amount of the Co satisfies the above-described range, the capacity characteristics may be improved. In a case in which y is 0, the capacity characteristics may be reduced. In a case in which y is greater than the above-described range, costs may be increased.

Also, in the lithium composite metal oxide of Formula 1, M1 may be at least one selected from the group consisting of Mn and Al. In a case in which the M1 is Mn, since the M1 improves the capacity characteristics and structural stability of the positive electrode active material, a secondary battery, as a final product, may have high capacity and output characteristics may be improved. In a case in which the M1 is Al, the M1 may improve the output characteristics of the active material.

The M1 may be included in an amount corresponding to z, that is, $0 < z \le 0.4$, particularly $0 < z \le 0.2$, and more particularly $0.02 < z \le 0.15$. When z is 0, an improvement effect due to the inclusion of the M1 may not be obtained. In a case in which z is greater than the above-described range, the output characteristics and capacity characteristics of the secondary battery may be reduced.

Furthermore, in the lithium composite metal oxide of Formula 1, M2 may be included in an amount corresponding to c, that is, $0 \le c \le 0.1$, for example, $0 \le c \le 0.05$. When the amount of the M2 satisfies the above-described range, the M2 may improve the structural stability of the positive electrode active material, and, as a result, the output characteristics of the secondary battery may be improved. Specifically, the M2 may include at least one element selected from the group consisting of Ba, Ca, Zr, Ti, Mg, Ta, Nb, and Mo, and, for example, may include at least one selected from the group consisting of Zr, Ti, and Mg.

a is a mole ratio of Li in the lithium composite metal oxide, b is a mole ratio of Ni, Co, and M1 in the lithium composite metal oxide, and c is a mole ratio of M2 in the lithium composite metal oxide. In this case, b+c may be 1.

The lithium composite metal oxide may include primary particles or a secondary particle in which the primary particles are agglomerated. In this case, the primary particles may be uniform or non-uniform. Also, the lithium composite metal oxide may further include a segregation phase of Zr oxide on a surface of the secondary particle or at an interface between the primary particles.

Also, the positive electrode active material may have an average particle diameter ($D_{50}$) of 1 μm to 20 μm. In a case in which the average particle diameter of the positive electrode active material is less than 1 μm, there is a concern that dispersibility in a positive electrode material mixture may be reduced due to the agglomeration of the positive electrode active material, and, in a case in which the average particle diameter of the positive electrode active material is greater than 20 μm, there is a concern that mechanical strength and specific surface area of the positive electrode active material may be reduced. Furthermore, the positive electrode active material may have an average particle diameter ($D_{50}$) of 3 μm to 18 μm in consideration of significant improvement in rate capability and initial capacity characteristics of the battery due to the control of the particle diameter of the positive electrode active material. Also, in a case in which the positive electrode active material includes the secondary particle, an average particle diameter ($D_{50}$) of the primary particles constituting the secondary particle may be in a range of 50 nm to 1,000 nm.

In the present invention, the average particle diameters ($D_{50}$) of the positive electrode active material may be defined as a particle diameter at 50% in a cumulative particle diameter distribution. In the present invention, the average particle diameters ($D_{50}$) of the positive electrode active material, for example, may be measured by using a laser diffraction method. Specifically, with respect to the average particle diameter ($D_{50}$) of the positive electrode active material, after particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

The positive electrode active material according to the embodiment of the present invention may include a surface treatment layer which is disposed on the core and includes an amorphous oxide containing a lithium (Li) oxide, a boron (B) oxide, and an aluminum (Al) oxide.

Since the amorphous oxide does not react with an electrolyte solution and hydrogen fluoride derived from the electrolyte solution and is disposed on the core, the amorphous oxide may prevent or minimize a direct contact between the core and the electrolyte solution and hydrogen fluoride derived from the electrolyte solution. Accordingly, since damage of the core due to the electrolyte solution and hydrogen fluoride derived from the electrolyte solution may be minimized, life characteristics of the lithium secondary battery, as the final product, may be improved.

Also, an amount of a lithium by-product present on a surface of the positive electrode active material may be less than 0.55 wt %, for example, in a range of 0.4 wt % to less than 0.55 wt % based on a total weight of the positive electrode active material. As described above, in a case in which a lithium composite metal oxide, in which the amount of the nickel is 60 mol % or more based on a total number of moles of the lithium composite metal oxide, is used as the core, high capacity characteristics may be exhibited, but it is disadvantageous in that an excessive amount of the lithium by-product may be formed on the surface of the positive electrode active material. Thus, in a case in which the surface treatment layer including the amorphous oxide is formed on the core, since the lithium by-product, such as LiOH and $Li_2CO_3$, present on a surface of the core reacts with boron- and/or aluminum-containing materials to be formed as the amorphous oxide, the amount of the lithium by-product in the positive electrode active material may be reduced. For example, in a case in which the amount of the lithium by-product present on the surface of the positive electrode active material is greater than the above range, a reaction of a lithium salt included in the electrolyte solution with the lithium by-product continuously occurs to generate oxygen, HF, $H_2O$, and other gases, and, as a result, performance of the lithium secondary battery may be adversely affected. Specifically, the reaction may be represented by the following Reaction Formula 1.

$LiPF_6 \rightarrow LiF + PF_5$ 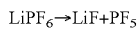

$PF_5 + 2LiOH \rightarrow 2LiF + H_2O + POF_3$ 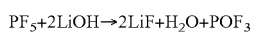

$PF_5 + H_2O \rightarrow POF_3 + 2HF$ 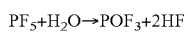

$4PF_5 + 2Li_2CO_3 \rightarrow 3LiPF_6 + 2CO_2 + LiPO_2F_2$ 

$2HF + Li_2CO_3 \rightarrow 2LiF + H_2O + CO_2$ <Reaction Formula 1> 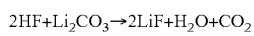

Specifically, the surface treatment layer may include a lithium oxide, a boron oxide, and an aluminum oxide, and, in the amorphous oxide in the surface treatment layer, an amount of the aluminum oxide is greater than an amount of the boron oxide. For example, the surface treatment layer may include the amorphous oxide containing $Li_2O$, $B_2O_3$, and $Al_2O_3$, and the $Li_2O$, the $B_2O_3$, and the $Al_2O_3$ may be chemically bonded to one another. Preferably, the amorphous oxide may be chemically bonded and present in the form of $Li_2O$—$B_2O_3$—$Al_2O_3$. For example, the amorphous oxide may be present in the form selected from the group consisting of $2LiAl_7B_4O_5$, $2LiAlB_2O_5$, and $2Li_2AlB_2O_5$, and the amorphous oxide may include B and Al in a mole ratio of greater than 1:1 to less than 1:2.5, for example, greater than 1:1 to less than 1:2. In a case in which the amorphous oxide may be chemically bonded and present while including B and Al within the above range as in the present invention, since an effect of reducing the lithium by-product present on the surface may be large, gas generation due to the reaction with the electrolyte solution may be improved.

For example, in a case in which the amorphous oxide included in the surface treatment layer is present in the form of a mixture of one of $Li_2O$, $B_2O_3$, and $Al_2O_3$, or two thereof are chemically bonded to each other and the remaining one exists alone, specifically, the amorphous oxide is present in the form of $Al_2O_3$, $Li_2O$—$Al_2O_3$, $Li_2O$—$B_2O_3$, or $Li_2O$—$B_4O_5$, since the effect of reducing the lithium by-product present on the surface may be small, a large amount of gas may be generated during the reaction with the electrolyte solution.

The $Li_2O$ may improve meltability or moldability by reducing high-temperature viscosity of the amorphous oxide. $Li_2O$ has excellent lithium ion conductivity and does not react with the electrolyte solution and hydrogen fluoride derived from the electrolyte solution during charging/discharging. Accordingly, the $Li_2O$ may improve life characteristics and cycle characteristics of the positive electrode active material by effectively protecting the core. The $Li_2O$ may be derived from LiOH and $Li_2CO_3$, as the lithium by-products present on the surface of the core.

The $B_2O_3$ is a main component constituting a glass composition, wherein it plays a role in increasing thermal and chemical stability by forming a three-dimensional network in glass. However, since the $B_2O_3$ reacts with moisture, it may reduce chemical stability of the surface treatment layer when a large amount of the $B_2O_3$ is included in the amorphous oxide.

The $Al_2O_3$ is a material having high lithium ion conductivity and may act as a network former in the amorphous oxide. The $Al_2O_3$ may affect a thermal expansion coefficient and high-temperature viscosity of the amorphous oxide.

In a case in which the surface treatment layer including the amorphous oxide is formed on the core, since the reaction with the electrolyte solution and hydrogen fluoride derived from the electrolyte solution may be suppressed during charging/discharging due to the excellent lithium ion conductivity, the life characteristics may be improved and a positive electrode active material having improved thermal stability may be provided.

Also, the above-described surface treatment layer including the amorphous oxide may be uniformly formed on the entire surface of the core.

The surface treatment layer may be uniformly formed to an appropriate thickness in consideration of a particle diameter of the core which determines capacity of the positive electrode active material. Specifically, based on a radius of the core, the surface treatment layer may have an average thickness of 20 nm to 100 nm, for example, 50 nm to 100 nm. When the average thickness of the surface treatment layer is less than the above range, an improvement effect resulting from the formation of the surface treatment layer may be insignificant, and, when the average thickness of the surface treatment layer is greater than the above range, resistance of the positive electrode active material may be increased.

In the present invention, the particle diameter of the core and the thickness of the surface treatment layer may be measured by cross-sectional analysis of the particle using a focused ion beam (FIB).

A method of preparing a positive electrode active material according to another embodiment of the present invention includes preparing a mixture by mixing a lithium composite metal oxide, a boron-containing raw material, and an aluminum-containing raw material; and forming a surface treatment layer including an amorphous oxide on a core including the lithium composite metal oxide by performing a heat treatment on the mixture in an oxygen atmosphere, wherein the forming of the amorphous oxide is to form an amorphous oxide containing lithium, boron, and aluminum by reaction of a lithium by-product present on a surface of the lithium composite metal oxide with the boron-containing raw material and the aluminum-containing raw material, an amount of the aluminum-containing raw material included is greater than 1 time to less than 2.5 times an amount of the boron-containing raw material included, and the heat treatment is performed in a temperature range of 500° C. to 800° C.

A type of the lithium composite metal oxide is not particularly limited as long as it is a compound capable of reversibly intercalating and deintercalating lithium (lithiated intercalation compound) which is commonly used in the art. For example, the lithium composite metal oxide may be represented by Formula 1. Also, the lithium composite metal oxide may be prepared by a general method used in the art, or a commercially available lithium composite metal oxide may be purchased and used.

In a case in which the amount of the nickel is 60 mol % or more base on the total number of moles of the lithium composite metal oxide, the positive electrode active material may exhibit high capacity characteristics, but an excessive amount of the lithium by-product may be formed on the surface of the positive electrode active material due to low reactivity between a lithium source and a precursor during sintering. As described above, in a case in which the excessive amount of the lithium by-product is present on the surface of the positive electrode active material, the reaction of the lithium salt included in the electrolyte solution with the lithium by-product occurs to generate gas, and, as a result, the performance of the secondary battery may be adversely affected.

Thus, since the lithium composite metal oxide, the boron-containing raw material, and the aluminum-containing raw material are mixed and heat-treated, the lithium by-product present on the surface of the lithium composite metal oxide reacts with the boron-containing raw material and the aluminum-containing raw material. Accordingly, the present inventors found that the amount of the lithium by-product present on the surface of the lithium composite metal oxide may not only be reduced, but a positive electrode active material having excellent output characteristics may also be prepared through the formation of an amorphous oxide having excellent lithium ion conductivity, thereby leading to the completion of the present invention.

The boron-containing raw material may include at least one of $H_3BO_3$, $HBPO_4$, $B_2O_3$, $B_2O_5$, $Li_2B_4O_7$, or $(NH_4)_2B_4O_7$, and may specifically be $H_3BO_3$.

The aluminum-containing raw material may include at least one of $Al(OH)_3$, $Al_2(SO_4)_3$, $AlCl_3$, or $Al(NO_3)_3$, and may specifically be $Al(OH)_3$.

In the first step, based on 100 parts by weight of the lithium composite metal oxide, the boron-containing raw material may be mixed in an amount of 0.1 parts by weight to 0.8 parts by weight, particularly 0.1 parts by weight to 0.5 parts by weight, and more particularly 0.1 parts by weight to 0.2 parts by weight, and the aluminum-containing raw material may be mixed in an amount of 0.1 parts by weight to 1 parts by weight, particularly 0.1 parts by weight to 0.5 parts by weight, and more particularly 0.3 parts by weight to 0.5 parts by weight. In this case, the amount of the aluminum-containing raw material included may be greater than 1 time to less than 2.5 times, for example, 1.1 times to twice the amount of the boron-containing raw material included.

As described above, in a case in which the amount of the aluminum-containing raw material is greater than the amount of the boron-containing raw material, $Li_2O$, $B_2O_3$, and $Al_2O_3$ may exist in a state in which they are chemically bonded to one another. In contrast, in a case in which the amount of the aluminum-containing raw material is the same as the amount of the boron-containing raw material, the amount of the boron-containing raw material is greater, or the amount of the aluminum-containing raw material is greater than the amount of the boron-containing raw material in a range exceeding the above range, the amorphous oxide may be present in the form of a mixture of one of $Li_2O$, $B_2O_3$, and $Al_2O_3$, or two thereof may be chemically bonded to each other and the remaining one may exist alone.

Also, during the mixing in the first step, the amount of the aluminum-containing raw material included may be greater than 1 time to less than 2.5 times, for example, 1.1 times to twice the amount of the boron-containing raw material included.

As described above, in a case in which the amount of the aluminum-containing raw material is greater than the amount of the boron-containing raw material, since the formation of a lithium boron aluminum oxide, in which $Li_2O$, $B_2O_3$, and $Al_2O_3$ are chemically bonded to one another, is favorable and the probability that the $Li_2O$, $B_2O_3$, and $Al_2O_3$ each exist alone in the surface treatment layer is low, the lithium by-product may be effectively reduced and output and resistance characteristics may be improved. In contrast, in the case that the amount of the aluminum-containing raw material is the same as the amount of the boron-containing raw material, the amount of the boron-containing raw material is greater, or the amount of the aluminum-containing raw material is greater than the amount of the boron-containing raw material in a range exceeding the above range, since $Li_2O$, $B_2O_3$, and $Al_2O_3$ each exist alone in the surface treatment layer, the lithium by-product reducing effect is insignificant, and thus, gas may be generated. Also, in a case in which $Li_2O$, $B_2O_3$, and $Al_2O_3$ each exist alone in the surface treatment layer, since the surface treatment layer may act as a resistance layer, resistance may be increased.

It is desirable that the mixing is solid-phase mixing. The reason for this is that, in a case in which a solid-phase mixing method is used, there is no concern about the formation of a side reaction product by a solvent used during liquid-phase mixing, and it is possible to form a more uniform surface treatment layer.

To be suitable for the solid-phase mixing, the boron-containing raw material may have an average particle diameter of greater than 5 μm to 50 μm or less. To be suitable for the solid-phase mixing, the aluminum-containing raw material may have an average particle diameter of greater than 0 μm to 1 μm or less. When the average particle diameters respectively satisfy the above-described ranges, the raw materials may be uniformly coated on the core, and an agglomeration phenomenon between the raw materials may be prevented.

Since the aluminum-containing raw material has lower reactivity than the boron-containing raw material, it is desirable that the average particle diameter of the aluminum-containing raw material is smaller than that of the boron-containing raw material.

A separate milling process may be performed on the boron and aluminum-containing raw materials to have the above-described average particle diameters. The milling may be a conventional milling process such as ball milling.

Next, the heat treatment in the second step may be performed in a temperature range of 500° C. to 800° C., for example, 500° C. to 700° C. If the above-described temperature range is satisfied, $Li_2O$, $B_2O_3$, and $Al_2O_3$ in the amorphous oxide may be present in a state in which they are chemically bonded to one another. If the temperature is less than the above-described temperature range, one of $Li_2O$, $B_2O_3$, and $Al_2O_3$ in the amorphous oxide is present in the form of a mixture, or two thereof are physically or chemically bonded to each other and the remaining one exists alone. Specifically, since $Al_2O_3$, $Li_2O$—$Al_2O_3$, $Li_2O$—$B_2O_3$, or $Li_2O$—$B_4O_5$ is present in the form of a mixture in the amorphous oxide, the effect due to the surface treatment layer of the present invention may not be obtained. If the temperature is greater than the above-described temperature range, the positive electrode active material may be modified.

The heat treatment process may be performed for 3 hours to 40 hours, for example, 5 hours to 10 hours under the above-described conditions.

Also, the heat treatment process may be performed in multiple stages within the above-described temperature range, and, in this case, the heat treatment process may be performed while changing the temperature variously as each stage progresses.

Furthermore, according to another embodiment of the present invention, a positive electrode including the above-described positive electrode active material may be provided.

Specifically, the positive electrode includes a positive electrode collector and a positive electrode active material layer formed on the positive electrode collector and including the positive electrode active material according to the present invention.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. For example, the above-described positive electrode active material as well as selectively the binder and the conductive agent is dissolved or dispersed in a solvent to form a slurry for forming a positive electrode active material layer, the slurry is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art, and, for example, the solvent may include dimethyl sulfoxide (DMSO), isopropyl alcohol, N-methylpyrrolidone (NMP), acetone, or water, but the present invention is not limited thereto. Any one thereof or a mixture of two or more thereof may be used as the solvent. An amount of the solvent used may be sufficient if the solvent may dissolve or disperse the positive electrode active material, the conductive agent, and the binder in consideration of a coating thickness of the slurry and manufacturing yield, and may allow to have a viscosity that may provide excellent thickness uniformity during the subsequent coating for the preparation of the positive electrode.

Also, as another method, the positive electrode may be prepared by casting the slurry for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer, for example, may be prepared by dissolving or dispersing the negative electrode active material as well as selectively the binder and the conductive agent in a solvent to form a slurry for forming a negative electrode, coating the slurry on the negative electrode collector and drying the coated negative electrode collector, or may be prepared by casting the slurry for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder, the conductive agent and solvent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, y-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

(Preparation of Positive Electrode Active Material)
$H_3BO_3$ and $Al(OH)_3$ were mixed in amounts as listed in Table 1 with 100 parts by weight of a lithium composite metal oxide ($Li(Ni_{0.83}Co_{0.11}Mn_{0.06})_{0.97}Zr_{0.03}O_2$) using a dry mixer (CYCLOMIX, HOSOKAWA Micron Corporation), and a heat treatment was then performed at a temperature listed in Table 1 for 5 hours in an oxygen atmosphere to prepare a positive electrode active material on which a surface treatment layer including an amorphous oxide listed in Table 1 was formed.

(Preparation of Positive Electrode)
The above-prepared positive electrode active material, carbon black as a conductive agent, and PVDF as a binder, at a weight ratio of 95:2.5:2.5 were mixed in N-methylpyrrolidone as a solvent, to prepare a composition for forming a positive electrode (viscosity: 5,000 mPa·s). An aluminum current collector was coated with the composition for forming a positive electrode, dried at 130° C., and then rolled to prepare a positive electrode.

(Preparation of Negative Electrode)
Natural graphite as a negative electrode active material, carbon black as a conductive agent, and polyvinylidene fluoride (PVDF) as a binder, at a weight ratio of 85:10:5 were mixed in N-methylpyrrolidone, as a solvent, to prepare a composition for forming a negative electrode, and a copper current collector was coated with the composition to prepare a negative electrode.

(Preparation of Lithium Secondary Battery)
An electrode assembly was prepared by disposing porous polyethylene, as a separator, between the positive electrode and the negative electrode, and a lithium secondary battery was prepared by disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/dimethyl carbonate/ethylmethyl carbonate (mixing volume ratio of EC/DMC/EMC=3/4/3).

Example 2

$H_3BO_3$ and $Al(OH)_3$ were mixed in amounts as listed in Table 1 with 100 parts by weight of a lithium composite metal oxide ($Li(Ni_{0.83}Co_{0.11}Mn_{0.06})_{0.97}Zr_{0.03}O_2$) using a dry mixer, and a heat treatment was then performed at 500° C. to prepare a positive electrode active material on which a surface treatment layer including an amorphous oxide having a composition as listed in Table 1 was formed. A positive electrode and a lithium secondary battery were prepared in the same manner as in Example 1 except that the above positive electrode active material was used.

Comparative Example 1

A positive electrode and a lithium secondary battery were prepared in the same manner as in Example 1 except that a lithium composite metal oxide ($Li(Ni_{0.83}Co_{0.11}Mn_{0.06})_{0.97}Zr_{0.03}O_2$), on which a surface treatment layer was not formed, was used as a positive electrode active material.

Comparative Example 2

$H_3BO_3$ was mixed in an amount as listed in Table 1 with 100 parts by weight of a lithium composite metal oxide ($Li(Ni_{0.83}Co_{0.11}Mn_{0.06})_{0.97}Zr_{0.03}O_2$) using a dry mixer, and a heat treatment was then performed at 300° C. to prepare a positive electrode active material on which a surface treatment layer including an amorphous oxide having a composition as listed in Table 1 was formed. A positive electrode and a lithium secondary battery were prepared in the same manner as in Example 1 except that the above positive electrode active material was used.

Comparative Example 3

Al(OH)$_3$ was mixed in an amount as listed in Table 1 with 100 parts by weight of a lithium composite metal oxide (Li(Ni$_{0.83}$Co$_{0.11}$Mn$_{0.06}$)$_{0.97}$Zr$_{0.03}$O$_2$) using a dry mixer, and a heat treatment was then performed at 300° C. to prepare a positive electrode active material on which a surface treatment layer including an amorphous oxide having a composition as listed in Table 1 was formed. A positive electrode and a lithium secondary battery were prepared in the same manner as in Example 1 except that the above positive electrode active material was used.

Comparative Example 4

H$_3$BO$_3$ and Al(OH)$_3$ were mixed in amounts as listed in Table 1 with 100 parts by weight of a lithium composite metal oxide (Li(Ni$_{0.83}$Co$_{0.11}$Mn$_{0.06}$)$_{0.97}$Zr$_{0.03}$O$_2$) using a dry mixer, and a heat treatment was then performed at 700° C. to prepare a positive electrode active material on which a surface treatment layer including an amorphous oxide having a composition as listed in Table 1 was formed. A positive electrode and a lithium secondary battery were prepared in the same manner as in Example 1 except that the above positive electrode active material was used.

Comparative Example 5

H$_3$BO$_3$ and Al(OH)$_3$ were mixed in amounts as listed in Table 1 with 100 parts by weight of a lithium composite metal oxide (Li(Ni$_{0.83}$Co$_{0.11}$Mn$_{0.06}$)$_{0.97}$Zr$_{0.03}$O$_2$) using a dry mixer, and a heat treatment was then performed at 700° C. to prepare a positive electrode active material on which a surface treatment layer including an amorphous oxide having a composition as listed in Table 1 was formed. A positive electrode and a lithium secondary battery were prepared in the same manner as in Example 1 except that the above positive electrode active material was used.

Comparative Example 6

H$_3$BO$_3$ and Al(OH)$_3$ were mixed in amounts as listed in Table 1 with 100 parts by weight of a lithium composite metal oxide (Li(Ni$_{0.83}$Co$_{0.11}$Mn$_{0.06}$)$_{0.97}$Zr$_{0.03}$O$_2$) using a dry mixer, and a heat treatment was then performed at 300° C. to prepare a positive electrode active material on which a surface treatment layer including an amorphous oxide having a composition as listed in Table 1 was formed. A positive electrode and a lithium secondary battery were prepared in the same manner as in Example 1 except that the above positive electrode active material was used.

Comparative Example 7

H$_3$BO$_3$ and Al(OH)$_3$ were mixed in amounts as listed in Table 1 with 100 parts by weight of a lithium composite metal oxide (Li(Ni$_{0.83}$Co$_{0.11}$Mn$_{0.06}$)$_{0.97}$Zr$_{0.03}$O$_2$) using a dry mixer, and a heat treatment was then performed at 700° C. to prepare a positive electrode active material on which a surface treatment layer including an amorphous oxide having a composition as listed in Table 1 was formed. A positive electrode and a lithium secondary battery were prepared in the same manner as in Example 1 except that the above positive electrode active material was used.

TABLE 1

| Category | H$_3$BO$_3$ (parts by weight) | Al(OH)$_3$ (parts by weight) | Heat treatment temperature (° C.) | Amorphous oxide Composition | Average thickness (nm) |
|---|---|---|---|---|---|
| Example 1 | 0.2 | 0.3 | 700 | Li$_2$O—B$_2$O$_3$—Al$_2$O$_3$ | 70 |
| Example 2 | 0.2 | 0.3 | 500 | Li$_2$O—B$_2$O$_3$—Al$_2$O$_3$ | 70 |
| Comparative Example 1 | 0 | 0 | 0 | — | — |
| Comparative Example 2 | 0.2 | 0 | 300 | Li$_2$O—B$_2$O$_3$ | 70 |
| Comparative Example 3 | 0 | 0.3 | 300 | Li$_2$O—Al$_2$O$_3$ | 70 |
| Comparative Example 4 | 0.2 | 0.2 | 700 | Li$_2$O—B$_2$O$_3$—Al$_2$O$_3$ | 70 |
| Comparative Example 5 | 0.3 | 0.2 | 700 | Li$_2$O—B$_2$O$_3$—Al$_2$O$_3$ | 70 |
| Comparative Example 6 | 0.2 | 0.3 | 300 | Li$_2$O—B$_2$O$_3$—Al$_2$O$_3$ | 70 |
| Comparative Example 7 | 0.2 | 0.5 | 700 | Li$_2$O—B$_2$O$_3$—Al$_2$O$_3$ | 70 |

Experimental Example 1

Characterization of Positive Electrode Active Material

An amount of a lithium by-product remaining on a surface of each of the positive electrode active materials prepared in Examples 1 and 2 and Comparative Examples 1 to 7 was measured by pH titration. In the pH titration, after distilled water was poured into 10 g of the positive electrode active material to dissolve the lithium by-product remaining on the surface of the positive electrode active material, the solution thus obtained was filtered and titrated by adding 0.1 M HCl at a rate of 0.3 mL/min to 0.5 mL/min. In this case, an amount of the residual lithium by-product was calculated from an amount of the HCl added to pH 5. Equipment by Metrohm AG was used for the pH titration. The results thereof are presented in the following Table 2. In the following Table 2, amounts of LiOH and Li$_2$CO$_3$ listed were weight % based on a total weight of the positive electrode active material.

TABLE 2

| Category | LiOH (wt %) | Li$_2$CO$_3$ (wt %) | Sum (wt %) |
|---|---|---|---|
| Example 1 | 0.424 | 0.057 | 0.481 |
| Example 2 | 0.428 | 0.115 | 0.543 |
| Comparative Example 1 | 0.480 | 0.730 | 1.210 |
| Comparative Example 2 | 0.422 | 0.135 | 0.557 |
| Comparative Example 3 | 0.465 | 0.564 | 1.029 |
| Comparative Example 4 | 0.433 | 0.125 | 0.558 |
| Comparative Example 5 | 0.438 | 0.127 | 0.565 |
| Comparative Example 6 | 0.452 | 0.157 | 0.609 |
| Comparative Example 7 | 0.44 | 0.131 | 0.571 |

Referring to Table 2, with respect to each of the positive electrode active materials prepared in Examples 1 and 2, the amount of the lithium by-product was less than about 0.55 wt % based on the total weight of the positive electrode active material, wherein it may be confirmed that the amount of the lithium by-product was smaller than those of the positive electrode active materials prepared in Comparative Examples 1 to 7.

Experimental Example 2

Characterization of Lithium Secondary Battery (1)

The lithium secondary batteries prepared in Examples and 2 and Comparative Examples 1 to 7 were charged and discharged 30 times at a temperature of 45° C. under conditions of 0.3 C/0.3 C within a driving voltage range of 2.5 V to 4.25 V. Then, a discharge capacity retention, as a ratio of discharge capacity according to the number of cycles to discharge capacity in the first cycle, was measured. The results thereof are presented in FIG. 1.

Referring to FIG. 1, the lithium secondary batteries of Examples 1 and 2 had a smaller change in capacity retention than Comparative Examples 1 to 7 even if the number of cycles was increased. Particularly, with respect to the lithium secondary battery of Example 1, there was almost no change in discharge capacity according to the number of cycles to discharge capacity in the first cycle.

Experimental Example 3

Characterization of Lithium Secondary Battery (2)

When evaluating life characteristics of each lithium secondary battery at 45° C., an initial discharge voltage drop was measured every 5 cycles for 0 second to 60 seconds and resistance was calculated by dividing the voltage drop by the current (0.3 C). As a result, direct current internal resistance (DCIR) at 45° C. in Example 1 was 10.6 mΩ.

Figure 2:
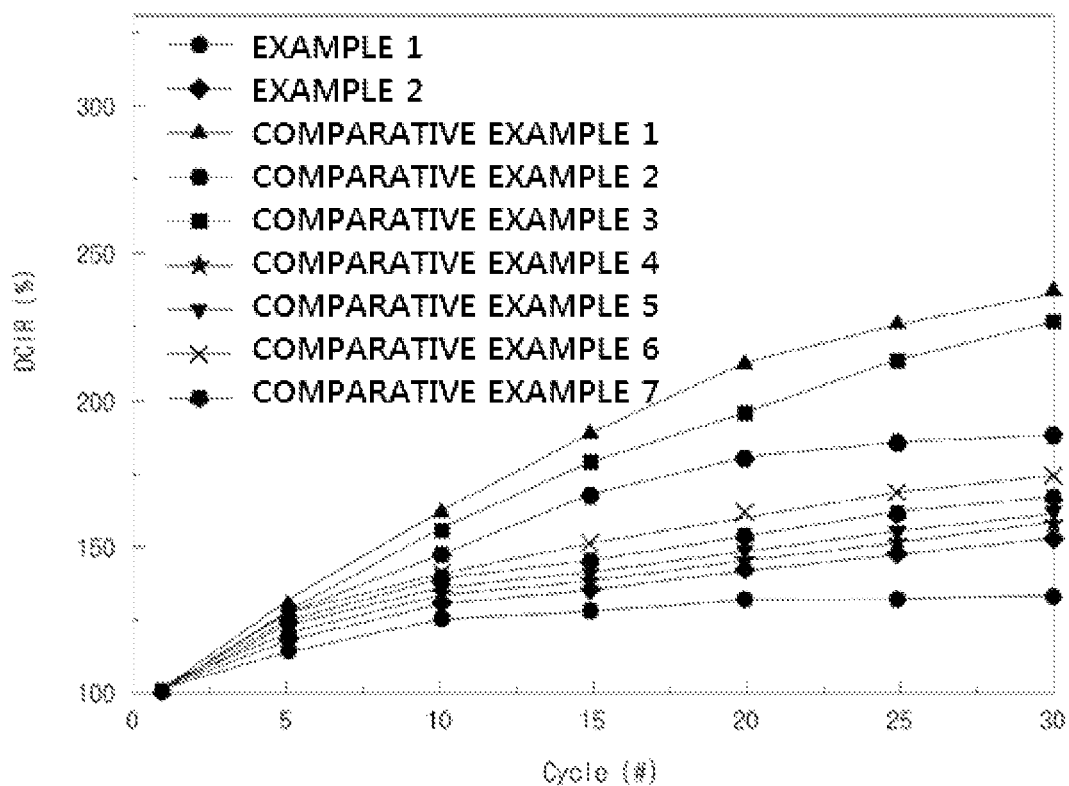
FIG. 2 is a graph illustrating direct current resistance increase rates according to the number of cycles relative to direct current resistances of the initial cycle of the lithium secondary batteries prepared in Examples 1 and 2 and Comparative Examples 1 to 7.

Referring to FIG. 2, since the lithium secondary batteries of Examples 1 and 2 had a lower direct current resistance increase rate than the lithium secondary batteries prepared in Comparative Examples 1 to 7, it may be expected that the lithium secondary batteries of Examples 1 and 2 may exhibit excellent power density.

Experimental Example 4

Characterization of Lithium Secondary Battery (3)

Each of the lithium secondary batteries prepared in Examples 1 and 2 and Comparative Examples 1 to 3 and 6 was charged at a constant current of 0.3 C to a voltage of 4.25 V and then stored at 60° C. for 6 weeks. An amount of gas generated in each lithium secondary battery over time was measured and illustrated in FIG. 3. The amount of gas generated in the lithium secondary battery was measured by a change in volume of the lithium secondary battery.

Figure 3:
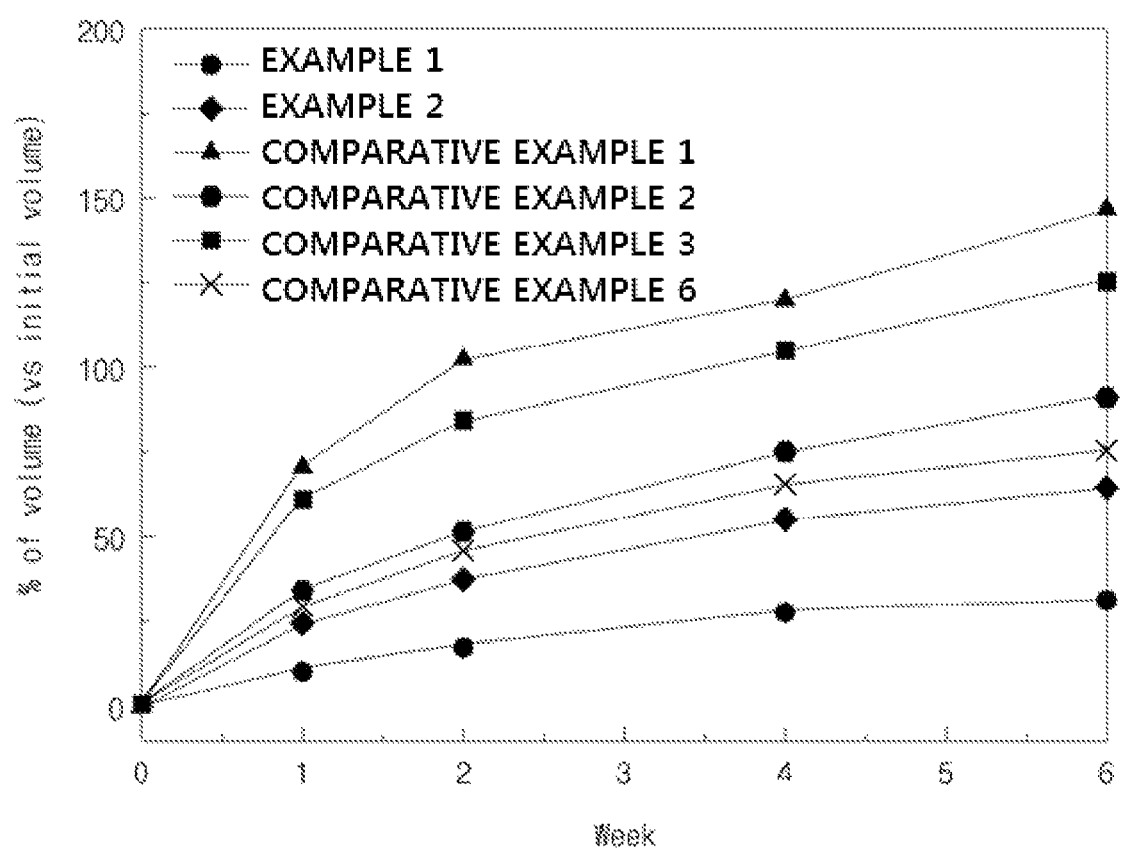
FIG. 3 is a graph illustrating gas generation amounts increased over time relative to initial gas generation amounts of the lithium secondary batteries prepared in Examples 1 and 2 and Comparative Examples 1 to 3 and 6.

Referring to FIG. 3, it may be confirmed that the amount of the gas generated in each of the lithium secondary batteries prepared in Examples 1 and 2 was significantly lower than those generated in the lithium secondary batteries prepared in Comparative Examples 1 to 3 and 6.

The invention claimed is:

1. A positive electrode active material for a secondary battery, the positive electrode active material comprising:
   a core including a lithium composite metal oxide; and
   a surface treatment layer which is disposed on the core and includes an amorphous oxide containing a lithium oxide, a boron oxide, and an aluminum oxide,
   wherein the lithium oxide, the boron oxide, and the aluminum oxide are chemically bonded to one another, and
   wherein, in the amorphous oxide in the surface treatment layer, an amount of the aluminum oxide is greater than an amount of the boron oxide, and wherein the amorphous oxide limits an amount of a lithium by-product present on a surface of the positive electrode active material, created during formation of the core, to less than 0.55 wt % based on a total weight of the positive electrode active material, and
   wherein a mole ratio of the boron oxide to the aluminum oxide is in a range of greater than 1:1 to less than 1:2.5.

2. The positive electrode active material for a secondary battery of claim 1, wherein the lithium composite metal oxide is represented by Formula 1:

$$Li_a(Ni_xCo_yM1_z)_bM2_cO_2 \qquad <\text{Formula 1}>$$

wherein, in Formula 1,
M1 is at least one element selected from the group consisting of manganese and aluminum, and
M2 is at least one element selected from the group consisting of barium, calcium, zirconium, titanium, magnesium, tantalum, niobium, and molybdenum,
wherein $1 \le a \le 1.5$, $0.9 \le b \le 1$, $0 \le c \le 0.1$, $0.6 \le x < 1$, $0 < y < 0.4$, $0 < z \le 0.4$, and $b+c=1$.

3. The positive electrode active material for a secondary battery of claim 1, wherein the lithium oxide is Li$_2$O, the boron oxide is B$_2$O$_3$, and the aluminum oxide is Al$_2$O$_3$.

4. The positive electrode active material for a secondary battery of claim 3, wherein the Li$_2$O, the B$_2$O$_3$, and the Al$_2$O$_3$ are chemically bonded to one another in a form selected from the group consisting of 2LiAl$_7$B$_4$O$_5$, 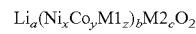 2LiAlB$_2$O$_5$, and 2Li$_2$AlB$_2$O$_5$.

5. The positive electrode active material for a secondary battery of claim 1, wherein the surface treatment layer has an average thickness of 20 nm to 100 nm.

6. The positive electrode active material for a secondary battery of claim 1, wherein the positive electrode active material has an average particle diameter (D$_{50}$) of 1 μm to 20 μm.

7. The positive electrode active material for a secondary battery of claim 1, wherein the lithium composite metal oxide is a secondary particle formed by agglomeration of primary particles, and further comprises a segregation phase of Zr oxide on a surface of the secondary particle or at an interface between the primary particles.

8. A positive electrode for a secondary battery, the positive electrode comprising the positive electrode active material of claim 1, a binder, a conductive agent, and a positive electrode collector.

9. A secondary battery comprising: the positive electrode of claim 8, a negative electrode disposed to face the positive electrode, a separator disposed between the positive electrode and the negative electrode, and an electrolyte.

10. A method of preparing the positive electrode active material for a secondary battery of claim 1, the method comprising:

preparing a mixture by mixing the core, a lithium-containing raw material, a boron-containing raw material, and an aluminum-containing raw material; and forming the surface treatment layer including the amorphous oxide on the core by performing a heat treatment on the mixture in an oxygen atmosphere at a temperature of 500° C. to 800° C., wherein the forming of the amorphous oxide is to form an amorphous oxide containing lithium, boron, and aluminum by reaction of the lithium by-product present on the surface of the lithium composite metal oxide with the boron-containing raw material and the aluminum-containing raw material.

11. The method of claim 10, wherein the boron-containing raw material is mixed in an amount of 0.1 parts by weight to 0.8 parts by weight and the aluminum-containing raw material is mixed in an amount of 0.1 parts by weight to 1 parts by weight, based on 100 parts by weight of the lithium composite metal oxide.

12. The method of claim 10, wherein the boron-containing raw material comprises at least one of $H_3BO_3$, $HBPO_4$, $B_2O_3$, $B_2O_5$, $Li_2B_4O_7$, or $(NH_4)_2B_4O_7$.

13. The method of claim 10, wherein the aluminum-containing raw material comprises at least one of $Al(OH)_3$, $Al_2(SO_4)_3$, $AlCl_3$, or $Al(NO_3)_3$.

14. The method of claim 10, wherein the lithium by-product comprises at least one of LiOH or $Li_2CO_3$.

* * * * *